United States Patent [19]
Herring

[11] 3,746,026
[45] July 17, 1973

[54] PIPELINE PLUGGING PIG

[76] Inventor: Joseph S. Herring, 8302 Neff, Houston, Tex.

[22] Filed: June 5, 1972

[21] Appl. No.: 259,445

[52] U.S. Cl............................ 137/1, 138/89, 138/90
[51] Int. Cl............................................. F16l 55/12
[58] Field of Search .................... 137/1, 15; 138/97, 138/90, 89

[56] References Cited
UNITED STATES PATENTS

| | | | |
|---|---|---|---|
| 3,381,714 | 5/1968 | Johnson | 138/97 |
| 3,693,408 | 9/1972 | Hyde | 138/90 |
| 3,503,424 | 3/1970 | Sawyer | 138/97 |
| 3,593,749 | 7/1971 | Reardon | 138/97 |

*Primary Examiner*—Alan Cohan
*Attorney*—George W. Price et al.

[57] ABSTRACT

A pipeline blocking pig to be propelled through a pipeline and stopped by an external command at a desired location to block the flow of fluid through the pipeline. Work functions of stopping the pig and sealing the pipeline are performed, respectively, by first spring means in pig and pipeline fluid under pressure. Pipeline fluid under pressure utilized to store energy in second spring means. Second spring means utilized to release pig and store energy in first spring means. Only minimum of self-contained electrical energy is required to initiate the release and transfer of stored energy from and between the two spring means.

12 Claims, 10 Drawing Figures

3,746,026

PIPELINE PLUGGING PIG

BACKGROUND OF THE INVENTION

This invention relates to methods and apparatus for plugging a fluid pipeline.

From time to time it is necessary to temporarily plug or block a pipeline at a predetermined location, and pipeline blocking pigs for accomplishing such blocking are known in the art. A blocking pig is inserted in the pipeline at a point providing access to the interior thereof and is moved along the pipeline by a fluid to the point where plugging or blocking is desired and where the pig is mechanically arrested. A sealing device carried on the pig, such as a bladder or resilient sealing ring, then is expanded to sealingly engage the pipeline wall to block the pipe interior with respect to the passage of fluid. Once the pipeline is blocked, a hydrostatic test may be performed on the upstream portion of the blocked section of the line to test the integrity of the welds, or some other type of work may be performed on the upstream or on the downstream sections of the line. After the tests or work has been completed the plugging pig must be released from its blocking position and either moved to another position within the pipeline or removed from the pipeline.

After the pipeline is blocked, the pig is required to remain fixed in position even though fluid pressure of hundreds of pounds per square inch is applied to one end thereof. Since it is often necessary that the blocking pig travel a substantial distance to the point where the blocking is desired, usually it is not feasible to supply energy thereto for the holding and sealing operations by means such as an electric cable or a fluid-carrying hose attached to and pulled by the pig. It is undesirable, for obvious reasons, to apply the holding and sealing forces by cutting an opening in the wall of the pipe and supplying the necessary obstruction and/or energy therethrough.

U.S. Pat. No. 3,381,714 issued May 7, 1968 to Johnson disclosed a blocking pig carrying a signal detector, batteries and a tank of compressed fluid for operating arresting pistons to stop the pig and for inflating a bladder to block the pipeline. The detector receives signals from a transmitter located exterior to the pipeline and controls valves within the pig which permit the compressed fluid in the tank to operate the pistons and to inflate the bladder. Such a construction and control eliminates some of the above-mentioned problems. However, each time that pig is stopped and the bladder is inflated and then the bladder is deflated and the pig is released, some of the compressed fluid is lost. Additionally, the apparatus disclosed in the above-mentioned patent requires a considerable amount of electrical energy to operate it.

Because of space and size limitations in a pipeline pig, there is a severe limitation on the number and size of storage batteries that may be carried. If the batteries carried by the pig are used only to initiate control operations, as opposed to supplying the power to perform blocking and sealing operations, only a relatively small demand will be placed on the batteries and the space required for batteries may be minimized.

SUMMARY OF THE INVENTION

In the pipeline blocking pig of this invention, the sealing force is supplied by the fluid pressure of the fluid used to move the pig through the pipeline and the arresting or stopping force is supplied by energy stored in springs, this energy being released on command. Furthermore, the force for restoring the stored energy to the springs is derived from the fluid pressure of the fluid in the pipeline.

In the preferred embodiment of the invention, the pipeline blocking pig has an elongated, generally cylindrical body which is centrally supported within the pipeline. A rearwardly facing resilient cup having an unexpanded diameter at least equal to the interior pipe diameter is mounted on the rear of the pig so that when the pig is stopped the rim of the cup is forced outwardly into sealing engagement with the pipe wall by the fluid at the rear of the pig, thereby preventing the flow of fluid past the cup. Prior to arresting the pig, the fluid in the line urges against the cup and forces the pig through the pipeline. At a designated location along the pipeline, signaling apparatus located external to the pipeline produces a radiant energy signal that is transmitted through the wall of the pipeline to electrical control apparatus carried by the pipeline blocking pig. This control apparatus initiates the operation of mechanisms which cause the pig to be stopped, or arrested, within the pipeline. The pig is arrested by a plurality of jaws which are normally spaced from the interior wall of the pipeline but which are moved outwardly of the body of the pig by a first set of springs to engage the interior wall when a plurality of dogs are withdrawn by a mechanism operating in response to the signal from the signaling apparatus. The dogs are carried by a hollow, reciprocable cylinder having a piston therein. The space between the piston and the cylinder is supplied with the pipeline fluid under pressure which causes the support member to compress a second set of springs. This second set of springs then is held in their energy storage condition by the above-mentioned dogs. When it is desired to release the plugging pig from its arrested position, the pipeline fluid pressure is reduced and another signal is transmitted from the external signaling apparatus. This second signal causes the dogs to be withdrawn, and allows the second set of springs to return the arresting jaws to their normal positions and to reset the first set of springs in their initial stored energy condition.

DESCRIPTION OF PREFERRED EMBODIMENT

Figure 1:
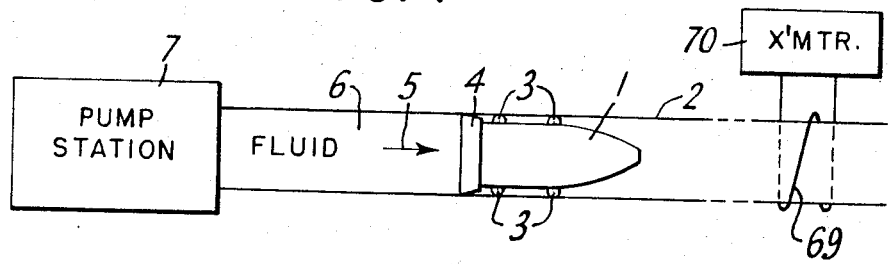
FIG. 1 is a schematic drawing illustrating the pipeline blocking pig of the invention located within a pipeline.

The pig 1 is supported within the pipeline 2 by a plurality of rollers or wheels 3 which engage the interior wall of the pipeline. Disposed at the left or rear end of pig 1 is a resilient cup 4 which may be made of polyurethane or some other elastomeric material. Cup 4 has an outer unexpanded diameter at least equal to the inner diameter of the pipeline 2. Cup 4 in cooperation with the body of the pig 1 act as a piston within the pipeline 2, and when the pig 1 is not arrested by the arresting jaws hereinafter described, it travels along the interior of the pipeline 2 in the direction of the arrow 5 by reason of fluid 6 under pressure, which fluid may, for example, be water, supplied to by a pump station 7.

Figure 3:
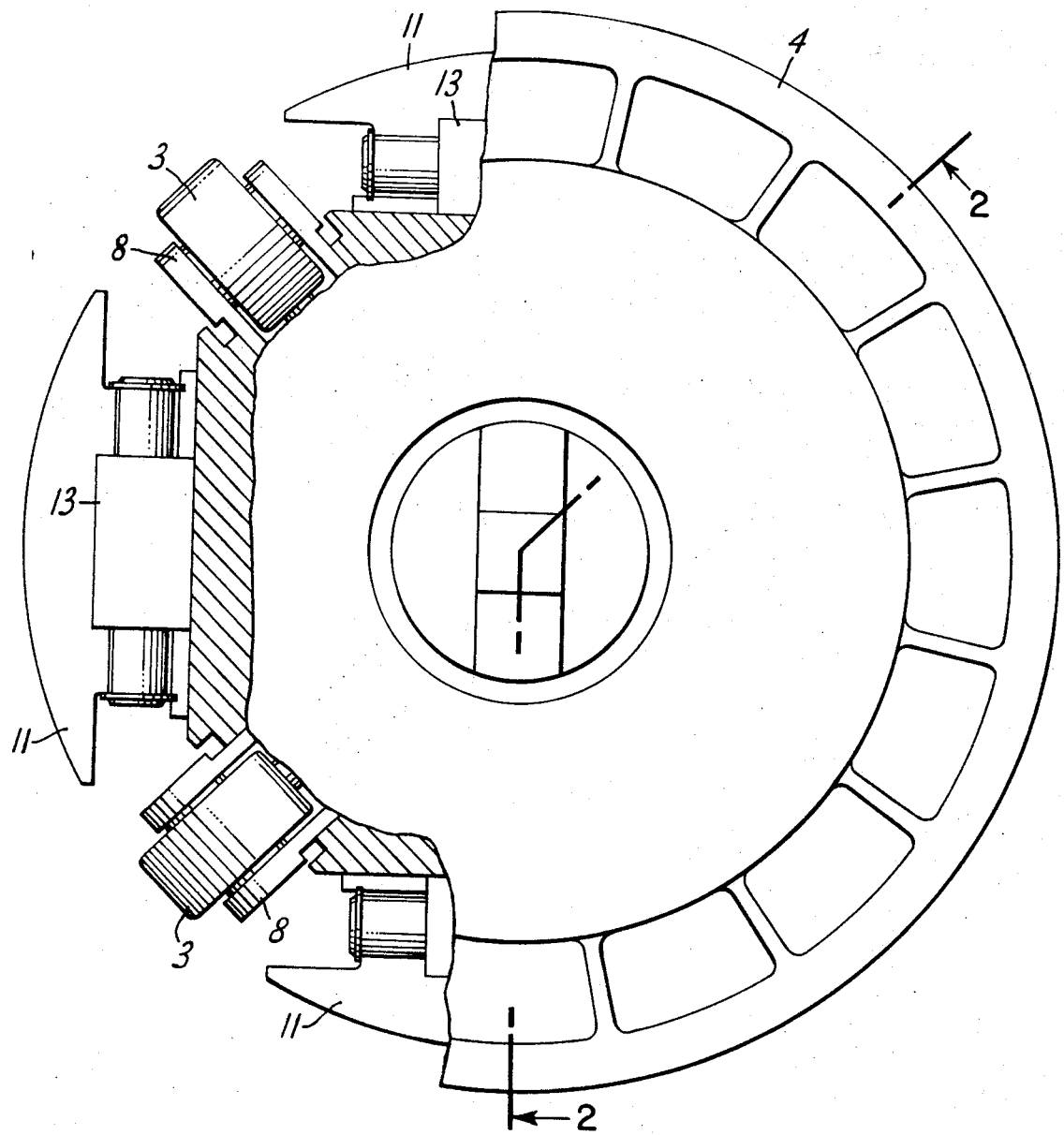
FIG. 3 is an enlarged, end elevation view, partly in cross-section, of the embodiment shown in FIG. 2.
Figure 2:
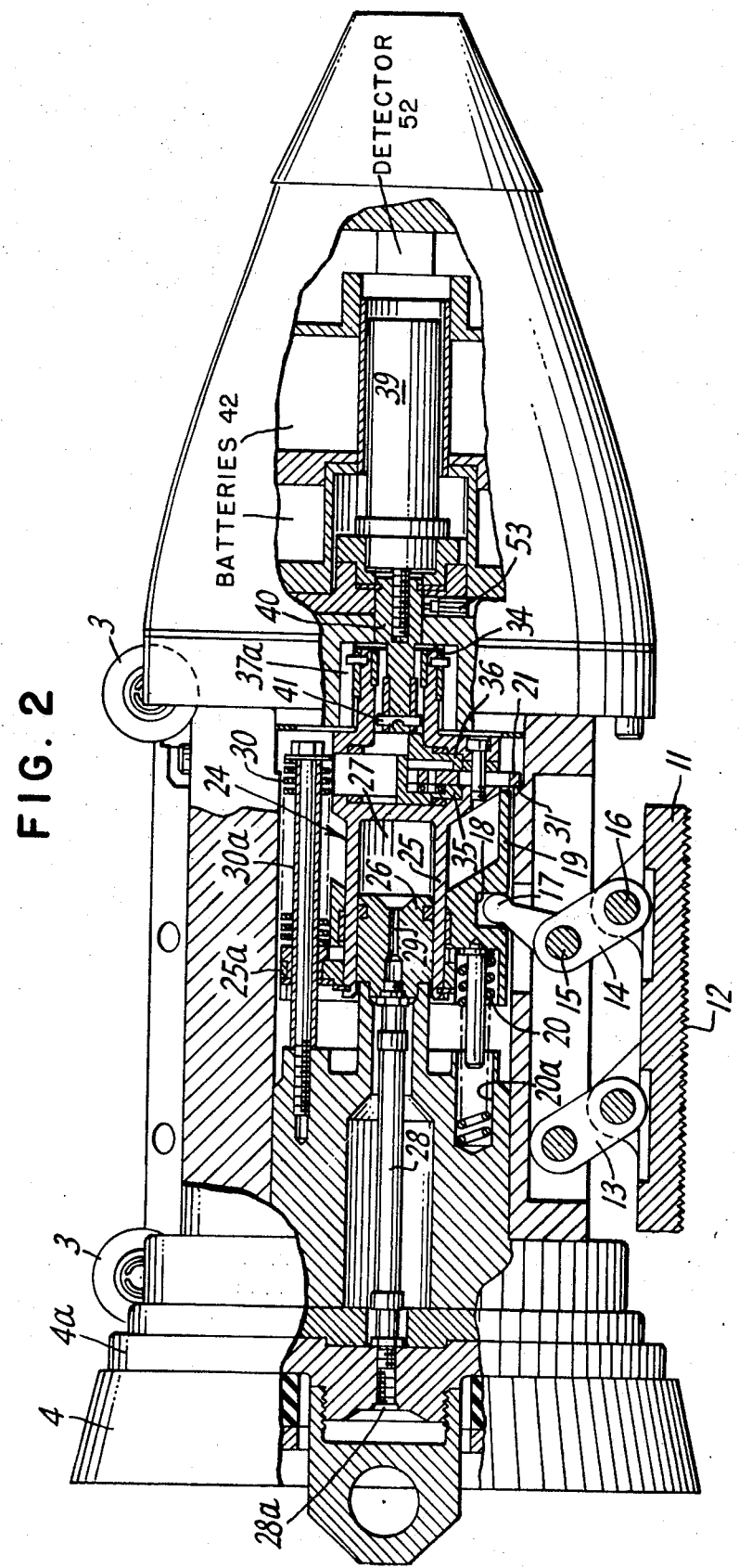
FIG. 2 is a side elevation view, partly in cross-section, of the preferred embodiment of the pipeline blocking pig of the invention, the section line being designated 2—2 in FIG. 3.

Pig 1 is illustrated in greater detail in FIGS. 2 and 3. This pig rides in the pipeline on two sets of resiliently mounted wheels or rollers 3.

A rigid metallic backing ring 4a supports cup 4 when the pig is in its blocking condition and prevents collapse of the cup under high pipeline fluid pressure.

Pig 1 carries four identical movable arresting jaws 11 disposed 90° apart around the periphery of the pig. As seen in FIGS. 2 and 3, each jaw 11 has a serrated arcuate face 12 which is adapted to engage the inner wall of the pipeline to arrest, or stop, the pig. As seen in FIG. 2, the left end of jaw 11 is pivotally attached to the body of pig 1 by a link 13. The right end of jaw 11 is pivotally connected at shaft 16 to a bell crank 14 that pivots about shaft 15. The upper end of bell crank 14 includes a follower 17 which is received in a recess 18 in a slidable cylindrical sleeve 19.

Figure 4:
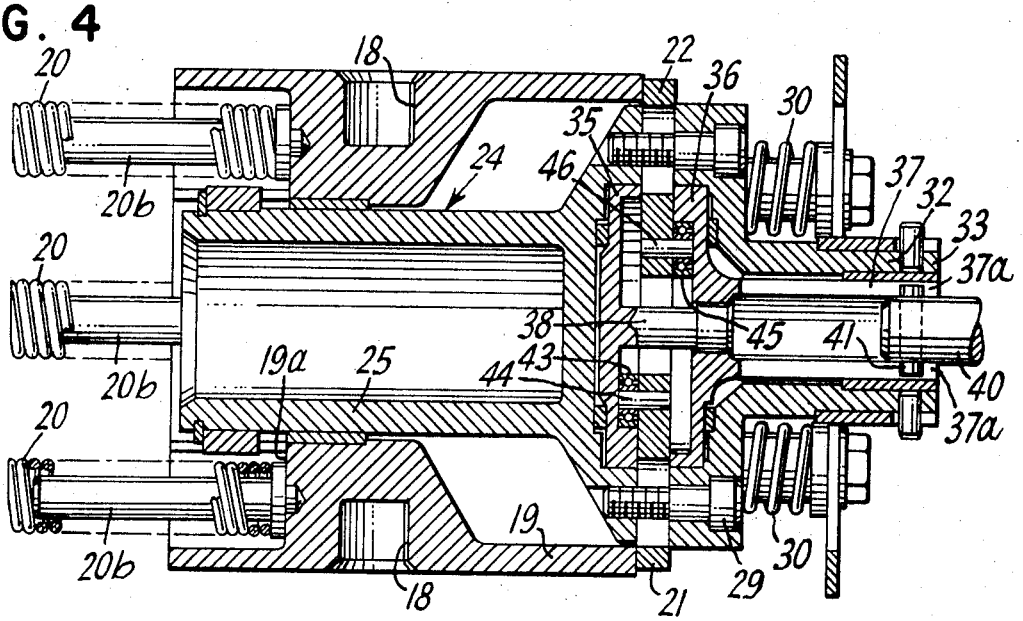
FIG. 4 is an enlarged cross-sectional, side elevation view of the dog and arresting jaw actuating unit forming part of the embodiment shown in FIG. 2.
Figure 9:
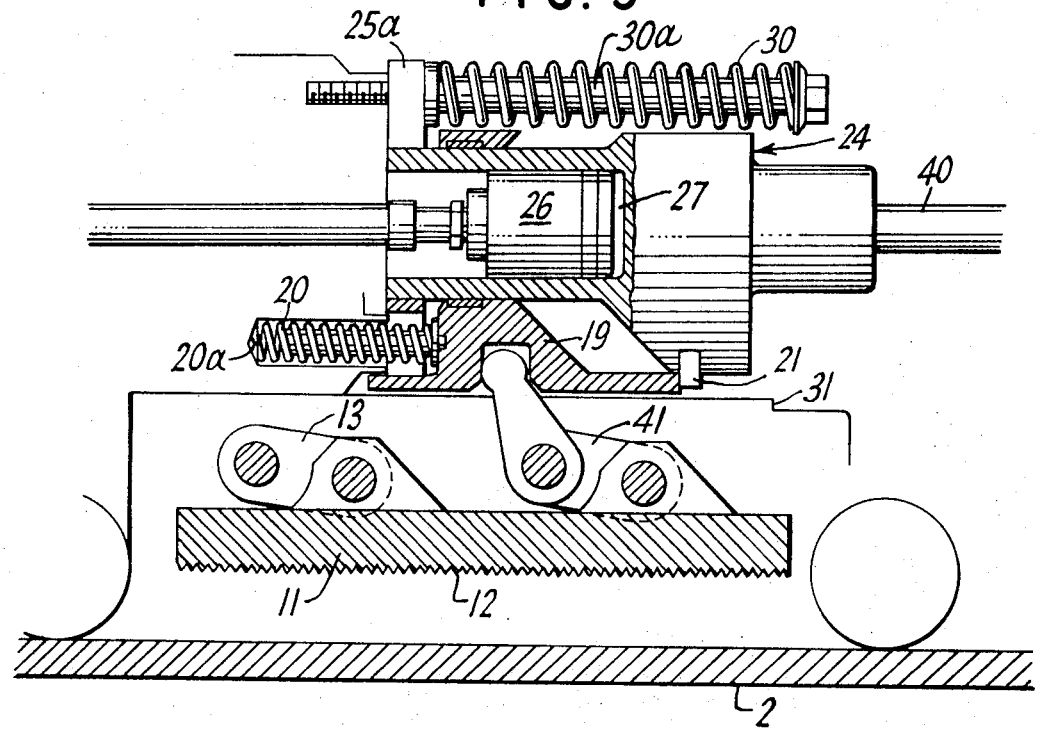
FIG. 9 is an enlarged side elevation view of the portion of the embodiment shown in FIG. 2 which operates the arresting jaws, the jaws being shown in the normal position which they assume when the pig is travelling.

As seen in FIGS. 2, 4 and 9, a first set of springs 20, preferably four in number, are received in apertures 20a in the body of pig 1. Apertures 20a are uniformly spaced about the axis of pig 1. Springs 20 are disposed about slidable push rods 20b whose right ends are received in notches in the vertical face 19a of sleeve 19.

The position of sleeve 19 when the pig is in its traveling mode, i.e., when it is being propelled through the pipeline, is illustrated in FIGS. 4 and 9. In this mode, springs 20 are in their compressed or energy storage condition and exert a force against sleeve 19. However, movement to the right of slidable sleeve 19 is prevented by latch means such as dogs 21 and 22 which are secured to axially movable support means 24, as will be described in detail below. As illustrated in FIG. 9, arresting jaws 11 are out of engagement with the wall of pipe 2 when the pig is in the traveling mode. For comparison, FIG. 10 illustrates the positions of slidable sleeve 19, jaws 11, and dogs 21 and 22 when the jaws are first brought into engagement with the wall of pipe 2 to arrest, or stop, the movement of pig 1.

Sleeve 19 is slidable not only with respect to the body of pig 1 but also with respect to the axially movable dog support member 24 which includes a cylindrically shaped member 25, FIGS. 2, 4, 9 and 10, which is coaxially disposed with respect to sleeve 19. Cylinder 25 surrounds a stationary piston 26 that is fixed with respect to the body of the pig. A space 27 between the end of the piston 26 and the centrally located wall of cylinder 25 is in fluid communication with interior of pipeline 2 by means of a central bore 29 in piston 26, FIG. 2, and by a pipe 28 which is open at its left end 28a to receive fluid from within the pipeline.

Figure 10:
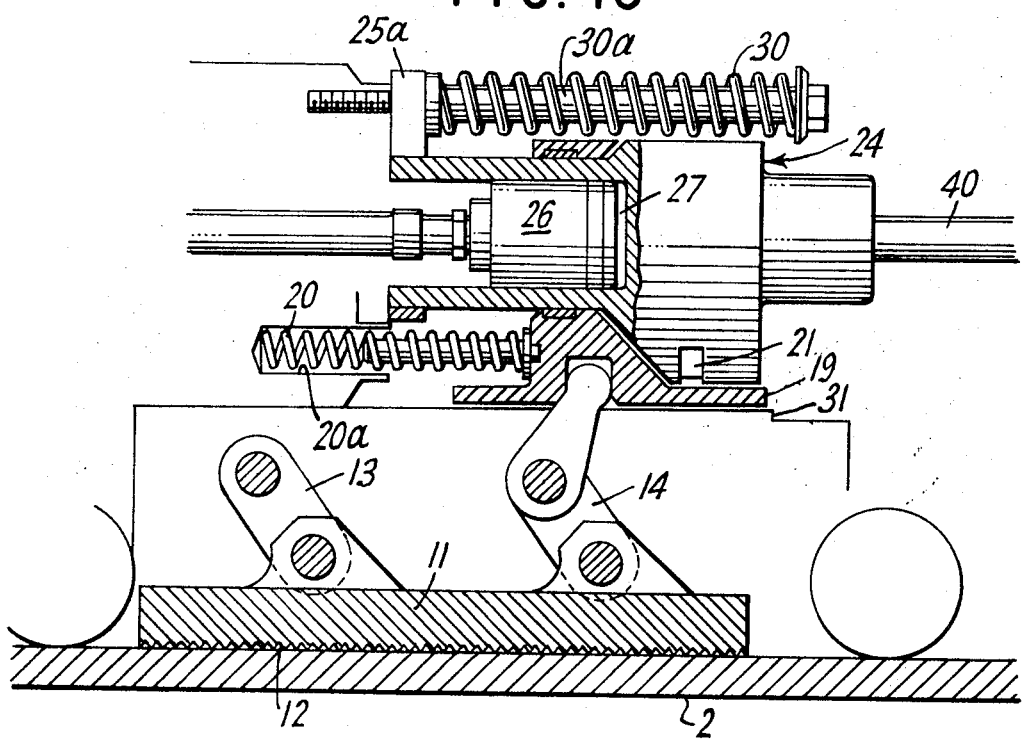
FIG. 10 is a view similar to FIG. 9 but showing the jaws in the position they assume to stop or arrest the pig.

A second set of springs 30, FIGS. 2, 9 and 10 are disposed in equally spaced relationship about cylinder 25 and are held in position by bolts 30a secured at their threaded ends in the body of pig 1. As best seen in FIGS. 9 and 10, the left ends of springs 30, which may be four in number, contact the radially extending skirt portion 25a of cylinder 25. Bolts 30 pass through apertures in skirt portion 25a.

During the traveling mode of operation, as depicted in FIG. 9, cylinder 25 is in its left-most-position so that space 27 is of minimum volume, and springs 30 are in their extended, i.e., relaxed condition. In the traveling mode of operation during which the first set of springs 20 are in their energy storage condition they urge push rods 20b against slidable sleeve 19 with a total force of 270 pounds, for example. During this traveling mode when the second set of springs 30 are in their extended condition they urge against the skirt 25a of cylinder 25 with a combined force of 450 pounds, for example. Thus, dogs 21 and 22, which are affixed to cylinder 25, have sufficient force acting on them toward the left to restrain sleeve 19 from sliding to the right.

In the initial arrested position depicted in FIG. 10, and during which dogs 21 and 22 are in their fully withdrawn position, springs 20 are in their relaxed conditions and exert a combined force of approximately 60 pounds against sleeve 19 which now has been moved to the right to cause jaws 11 to swing outwardly to engage the wall of pipe 2. The fluid pressure acting against cup 4 will maintain jaws 11 in arresting engagement with the wall of the pipeline.

After pig 1 has been arrested at a desired location, as will be explained more fully below, pipeline fluid under a pressure which may range from 600 to 3,000 pounds per square inch, for example, is supplied to the space 27 between piston 26 and cylinder 25. This force acting on cylinder 25 exceeds the 460 pound force exerted by the second set of springs 30 and forces cylinder 25 to the right, thereby compressing springs 30 and placing them in their energy storage condition, as illustrated in FIG. 2. At this time, dogs 21 and 22 will be extended outwardly, as will be described below, to engage shoulder 31 in the body of pig 1 so as to hold cylinder 25 and springs 30 in their right-most, or locked condition. In this condition, the second set of springs 30 exert a total force of approximately 1,000 pounds against skirt 25a of cylinder 25.

When it is desired to unplug pipeline 2, the fluid pressure in the line is reduced substantially to zero, thereby removing the fluid pressure acting on cylinder 25. Then in response to a second signal from transmitter 70 dogs 21 and 22 are caused to be withdrawn from engagement with shoulder 31 as a result of a 180° rotation of motor 39 and cams 35 and 36. Dogs 21 and 22 are returned to their position illustrated in FIGS. 4 and 9 and springs 30 now force cylinder 25 and sleeve 19 to their left-most-position illustrated in FIG. 9. This restores springs 20 to their initial energy storage condition. Dogs 21 and 22 hold sleeve 19 in this position since they are attached to cylinder 25 and the 460 pound force exerted by the second set of springs 30 against cylinder 25 is greater than the 270 pound force exerted by the first set of springs 20 against sleeve 19.

Figure 5:
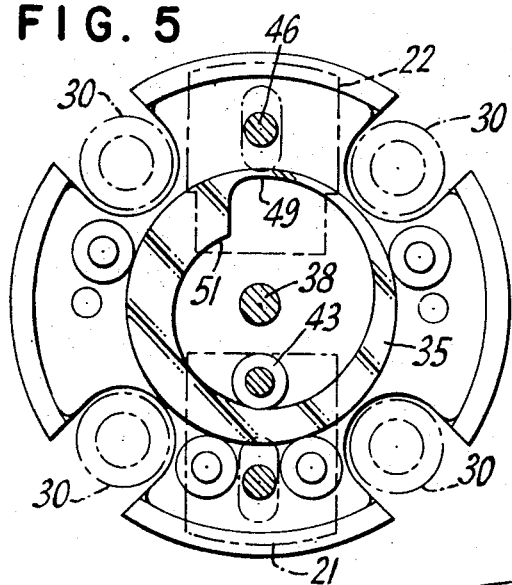
FIG. 5 is an end elevation view, partly in cross-section, of a portion of the unit shown in FIG. 4.
Figure 6:
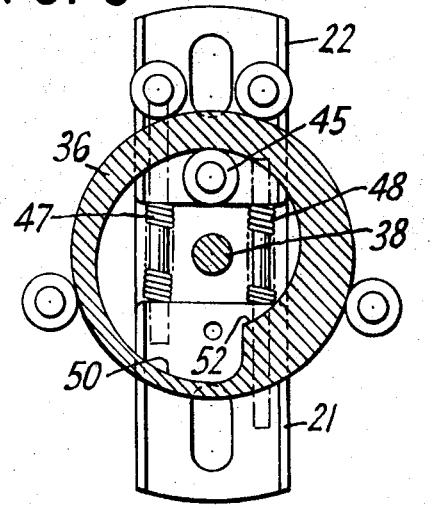
FIG. 6 is a fragmentary end elevation view, partly in cross-section, of a portion of the unit shown in FIG. 5.

The support member 24 for dogs 21 and 22 and the actuating mechanism for them are shown in greater detail in FIGS. 4-6. As seen in FIG. 4, the right end of cylinder 25 is secured by bolts 29 to a flanged sleeve 32 which is slidably but not rotatably mounted on the body of pig 1. Movement of cylinder 25 to the right, as viewed in FIG. 2, is limited by engagement of the end 33 of the sleeve 32 with the body portion 34. Dogs 21 and 22 are mounted for radial movement inwardly and outwardly of the axis of the pig between cylinder 25 and sleeve 32. Dogs 21 and 22 are moved radially by a pair of cams 35 and 36 which are rotatably mounted between cylinder 25 and sleeve 32. Cam 36 is secured to centrally disposed slotted tubular shaft 37 which rotates cam 36, which in turn rotates the cam 35 by means of a shaft 38 extending between and secured to the cams.

As seen in FIG. 2, tubular shaft 37 is driven by an electric motor 39 having a shaft 40 with a pin 41 extending therethrough. The ends of pin 41 extend into the slotted portion 37a of tubular shaft 37. This arrangement permits tubular shaft 37 to move axially of the shaft 40 when cylinder 25 is moved axially and permits the shaft 40 to rotate tubular shaft 37 regardless of the relative longitudinal positions of the tubular shaft 37 and pin 41.

By means of controls hereinafter described, shaft 40 of electric motor 39 rotates through 180° each time motor 39 is energized. The cam face of the cam 35 engages a roller 43, FIG. 5, carried on a shaft 44 extending from the dog 21. The cam face of cam 36, FIG. 6, engages a roller 45 mounted on a shaft 46 extending from the dog 22. The cam faces of the cams 35 and 36 are identical but oppositely oriented so that as the cams are rotated the dogs 21 and 22 move inwardly or outwardly together. As shown in FIG. 6, a pair of springs 47 and 48 tend to urge dogs 21 and 22 outwardly.

When cams 35 and 36 are in the positions shown in FIGS. 5 and 6, motor 39 is de-energized in a first position and dogs 21 and 22 are extended to the position shown in FIGS. 4 and 9. Thus, dogs 21 and 22 engage the right end of the sleeve 19 but are withdrawn past the shoulder 31, FIG. 9. This is the traveling mode of the pig. When the motor 39 again is energized cams 35 and 36 rotate 180° counterclockewise as viewed in FIGS. 5 and 6 and the motor is automatically de-energized.

During the course of the last-mentioned rotation of cams 35 and 36, dogs 21 and 22 will be withdrawn inwardly to their maximum extent by virtue of the engagement of the rollers 43 and 45 with the thickest portions 51 and 52 of the cam surfaces of cams 35 and 36. The dogs 21 and 22 will at that time clear the end of and therefore release sleeve 19 so that it is slid to the right by springs 20 and assumes the position shown in FIG. 10. Such release of the sleeve 19 causes it to rotate bell cranks 14 in the clockwise direction, thereby forcing jaws 11 into arresting engagement with the interior wall of pipeline 2.

At this point in the cycle of operation, the rollers 43 and 45 will have passed the thickest portions 51 and 52 of cams 35 and 36 and will be on the narrowest portions 49 and 50 of the cams. Dogs 21 and 22 now may extend outwardly to their maximum radial extent after they have been translated to the right beyond the end of the sleeve 19. Dogs 21 and 22 now will assume the positions shown in FIG. 2 where they are in latching engagement with the shoulder 31. At this time the pig is in its fully arrested position and is completely plugging the pipeline.

Figure 7:
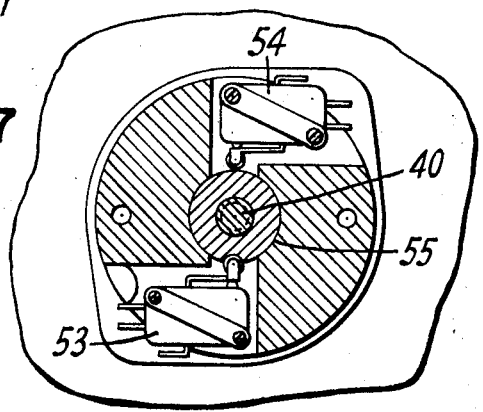
FIG. 7 is a fragmentary end elevation view, partly in cross-section, of a switch operating portion of the unit shown in FIG. 2.

The stopping of cams 35 and 36 at the positions described is controlled by a pair of switches 53 and 54, FIG. 7, which are disposed adjacent a cam 55 carried on the shaft 40. Thus, in the position of the cam 55 shown in FIG. 7, the switch 53 is open and the switch 54 is closed. When the shaft 40 rotates through 180° from the position illustrated, switch 54 is open and switch 53 is closed.

Motor 39 is operated in response to signals coupled through pipeline 2 from a transmitter 70, FIG. 1, located external to the pipeline. Transmitter 70 may be any of various types of apparatus or means for propagating radiant energy through the interior of the pipeline. For purposes of description it will be assumed that transmitter 70 is a controllable variable frequency oscillator, or individual oscillators, capable of generating electrical signals of two different frequencies which are low enough for the signals to propagate through the wall of pipeline 2. The signals from transmitter 70 are coupled to coil 69 which is disposed on or about pipeline 2.

Figure 8:
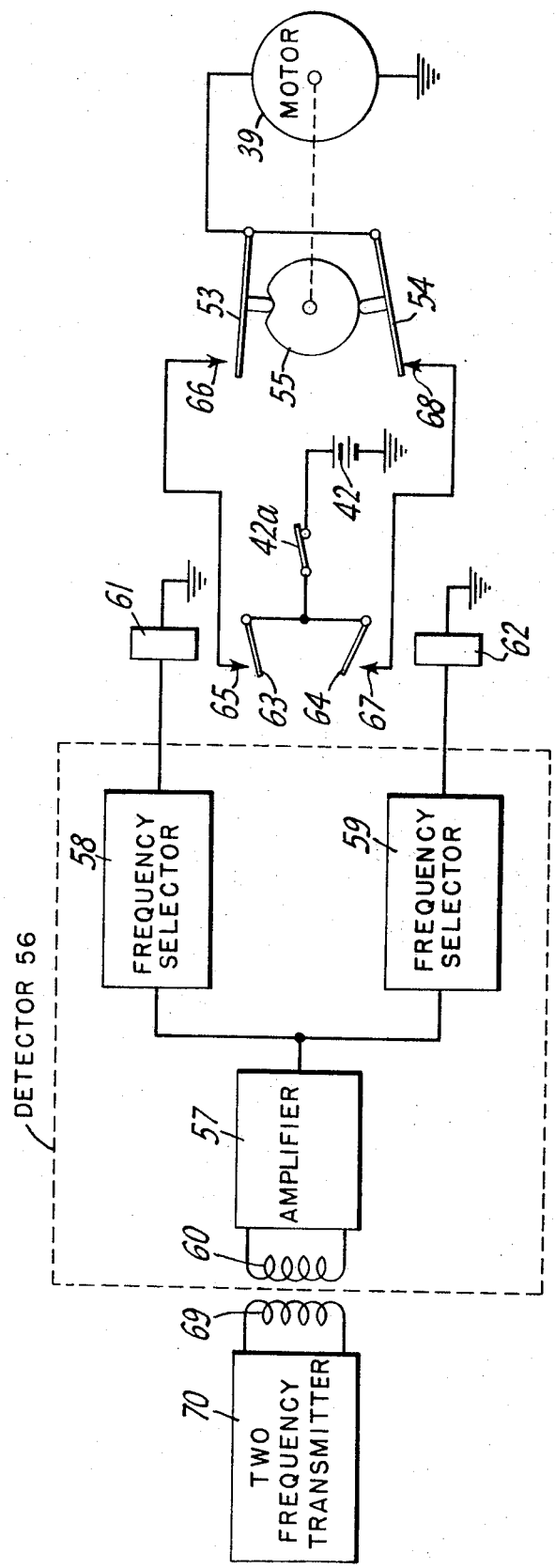
FIG. 8 is a schematic electrical diagram of the electrical circuits employed to control the motor which is illustrated in FIG. 2.

One embodiment of the electrical control circuit for the motor 39 is illustrated in FIG. 8. A signal detector 56 mounted near the forward end of the pig is responsive to radiant energy signals from coil 69. The detector comprises an amplifier 57 and first and second frequency selectors 58 and 59. Depending upon the frequency of the signal received at the input 60 of the amplifier 57, one or other of the relays 61 and 62 will be energized. For example, if it is assumed that the frequency selector 58 responds to a 400 Hz signal received at the input 60, then, the relay 61 will be energized. Similarly, if it is assumed that the frequency selector 59 responds to a 800 Hz signal received at the input 60 then relay 62 will be energized. Relay 61 operates an armature 63 and relay 62 operates an armature 64, both armatures being connected to the batteries 42 through a switch 42a. The contact 65 of relay 61 is connected to contact 66 of switch 53 and contact 67 of relay 62 is connected to contact 68 of the switch 54. As will be seen from an examination of FIG. 8, it is necessary that the detector receive a signal of a frequency to which the frequency selector 59 will respond in order to activate motor 39. However, when the motor 39 rotates the cam 55 by 180° from the position illustrated in FIG. 8, switch 54 will open, thereby stopping motor 39. Similarly, in the latter position of the cam 55, switch 53 will be closed so that when a signal of the frequency to which the frequency selector 58 will respond is received, the motor 39 will be energized and will rotate cam 55 through 180° at which point switch 53 will open and stop motor 39.

The operation of the apparatus of the invention may be summarized mainly in connection with FIGS. 1, 2, 9 and 10. Coil 69 is placed around the pipeline at the desired location and the plugging pig is inserted in the pipeline 2 through a launching trap. The pig will be propelled through the interior of pipeline by fluid 6 from pump station 7. Arresting jaws 11 will be in the positions shown in FIG. 9 with the springs 20 in their energy storage condition and with the sleeve 19 restrained by the dogs 21 and 22. When pig 1 reaches a position within the radiating field of coil 69 relay 62 will be energized, motor 39 will rotate its shaft 40, and hence, the cams 35, 36 and 55, by 180°. Such rotation of the cams 35 and 36 will first withdraw dogs 21 and 22 to the positions shown in FIG. 10, thereby releasing sleeve 19 and permitting the springs 20 to slide the sleeve 19 into the position shown in FIG. 10. This movement rotates the linking bell cranks 14 and moves the arresting jaws 11 into engagement with the interior wall of the pipeline to stop the pig.

The introduction of fluid under high pressure into the space 27 between cylinder 25 and piston 26 causes cylinder 25 to move toward the right and to compress the springs 30. Dogs 21 and 22 will be moved axially beyond the forward end of the sleeve 19, and due to the force of the springs 46 and 48, FIG. 6, urging them outwardly, they will engage shoulder 31 to assume the latched positions shown in FIG. 2. Under these conditions, pig 1 will remain stationary and the cup 4 will securely block the passage of fluid around the pig. Even should the fluid pressure thereafter be reduced, return of the sleeve 19 to its left-most-position shown in FIG. 9, and consequent withdrawal of the jaws 11, will be prevented because of engagement of dogs 21 and 22 with the shoulder. Springs 30 thus are held in their stored energy condition. In this condition, hydrostatic tests, or other types of work or repair may be performed on the pipeline.

When it thereafter is desired to unblock or unplug the pipeline, the pressure of fluid 6 is reduced substantially to zero, and transmitter 70 is caused to transmit a second signal of a second frequency which will energize relay 61, FIG. 8, thereby causing motor 39 to rotate its shaft 40, and hence, the cams 35, 36 and 55, by 180°. Cams 35 and 36 will assume the positions shown in FIGS. 5 and 6 causing the withdrawal of dogs 21 and 22 to the positions shown in FIGS. 4 and 9 where they are disengaged from the shoulder 31 but are in engagement with the right end of the sleeve 19. Springs 30 will now slide cylinder 25 to the left, which in turn will move sleeve 19 to the left because of the engage of the dogs 21 and 22 therewith. Such movement of sleeve 19 restores springs 20 to their energy storage condition. As sleeve 19 moves to the left it will rotate bell crank 14 in a counterclockwise direction to cause jaws 11 to withdraw inwardly to assume the positions shown in FIG. 9. Renewed application of fluid under pressure at the rear of the pig 1 then causes it to move along the pipeline 2. The pig may again be arrested for the purpose of blocking the pipeline at another predetermined location in the manner described hereinbefore, or it may be recovered from the pipeline.

From the above description it is seen that the pipeline plugging pig of this invention is remotely and automatically operated by apparatus that requires a minimum of stored electrical energy in the pig. This is accomplished by employing two set of springs wherein the first set initially is in its stored energy condition and the second set initially is in its relaxed condition which is chosen so that the second set of springs exerts sufficient force to hold the first set in its stored energy condition. Upon actuation of control means by an externally generated signal, the first set of springs exerts its stored energy through linking means to bring arresting means into contact with the pipeline wall to stop the pig. An elastomeric cup carried by the pig is forced into sealing engagement with the pipeline wall to block fluid flow in the line and thereby establish a differential fluid pressure at different portions of the pig. The differential fluid pressure is utilized to actuate a mechanism which sets and locks the second set of springs in its stored energy condition. Upon removal of the differential pressure, and upon actuation of the control means by a second externally generated signal, the stored energy in the second set of springs is released and transferred to the first set of springs to again set them in their stored energy condition. During this transfer of stored energy between the two sets of springs, linking means are actuated to withdraw the arresting means from the pipeline wall and thereby unblock the pipeline. With the apparatus and operation described, the heavy work functions of stopping the pig and sealing the pipeline are performed by springs and by the pipeline fluid pressure. The fluid pressure is utilized to store energy in one set of springs and only a minimum of self-contained energy within the pig is required to initiate the release and transfer the stored energy from and between the sets of springs.

Although the above-described apparatus represents the presently preferred embodiment of the invention, alternative embodiments may be constructed without departing from the scope of the invention. For example, in the present invention dogs 21 and 22 engage shoulder 31 to hold cylinder 25 and springs 30 in a locked position irrespective of the fluid pressure in the pipeline. In some instances where it is certain that high pipeline pressure will be maintained while the pig is in a blocking condition it may not be necessary to have the separate locking means. Furthermore, means other than the dogs 21 and 22 may be used to hold cylinder 25 and springs 30 in their locked position when that function is desired. It will be appreciated that the fluid pressure responsive piston and cylinder mechanism described above is but one example of suitable mechanisms that might be used. As an alternative, the piston might be made to be the movable member and the cylinder might be fixed relative to the body of the pig. Additionally, a bellows arrangement might be used in place of the piston and cylinder.

What is claimed is:

1. In a method for operating a pipeline plugging pig, wherein the pig includes pig arresting means and pipeline blocking means, the steps comprising moving the pipeline plugging pig to a desired location in a pipeline, releasing energy stored in a first mechanical energy storage means carried on the pig, transmitting a force resulting from releasing said energy to move said arresting means into contact with the pipeline wall to stop the pig, blocking the pipeline with said blocking means to prevent the flow of fluid therethrough and thereby establish a fluid pressure force acting on at least a portion of the pig when fluid under pressure is in the pipeline, transmitting a force exerted by said fluid pressure to a second mechanical energy storage means carried on the pig, storing in the second mechanical energy storage means energy transferred thereto as a result of the fluid pressure force being transmitted thereto, releasing stored energy from said second storage means and transferring at least a portion thereof to said first energy storage means to replenish energy previously released therefrom, in response to the release of stored energy from the second storage means, applying a force to disengage said arresting means from the pipeline wall, and unblocking the pipeline.

2. A method for controlling fluid flow in a section of pipeline comprising introducing into the pipeline at a point in advance of said section a pipeline plugging pig having a resilient member extending therefrom and engageable with the interior wall of said pipeline upon the application of fluid under pressure thereto, internal energy storing means and stopping means operable by the energy stored in said storing means, introducing a propellant fluid into the pipeline at the rear of said pig to propel the pig through the pipeline to the section to be controlled, stopping the pig at said section by applying energy stored in said storing means to said stopping means to thereby operate said stopping means, continuing the supply of fluid to the rear of said pig and to said resilient member to thereby press said resilient member against said interior wall, transmitting and storing energy of said fluid in said energy storing means, reducing the pressure of said fluid after energy thereof has been stored in said energy storing means, and applying energy from said storing means to said stopping means to release said stopping means.

3. A method as set forth in claim 2, wherein said energy storing means comprises a pair of energy storing means and wherein energy of one of said pair of storing means is applied to said stopping means to stop said plug, energy of said fluid is stored in the other of said pair of storing means, and thereafter, the fluid pressure is reduced and energy of said other storing means is applied to said stopping means to release the latter and is transferred to said one storing means to restore energy therein.

4. In a method for operating a pipeline plugging pig, wherein the pig includes pig arresting means and pipeline blocking means, the steps comprising moving the pipeline plugging pig to a desired location in a pipeline, releasing energy stored in a first set of springs carried on the pig, utilizing released energy from the springs to move said arresting means into contact with the pipeline wall to stop the pig, blocking the pipeline with said blocking means to prevent the flow of fluid therethrough and thereby establish a fluid pressure force acting on at least a portion of the pig when fluid under pressure is in the pipeline, admitting pipeline fluid under pressure into said pig, transmitting a force exerted by said admitted fluid to a second set of springs on the pig, storing in the second set of springs energy transferred thereto from the admitted fluid under pressure, reducing the pressure of pipeline fluid admitted to said pig, releasing stored energy from said second set of springs and transferring at least a portion of the released energy to said first set of springs to replenish energy previously released therefrom, in response to the release of stored energy from sid said set of springs, applying a force to disengage said arresting means from the pipeline wall, and unblocking the pipeline.

5. A pipeline plugging pig comprising a body adapted to move through a pipeline, pig arresting means attached to said body and movable between a withdrawn position and an arresting position displaced outwardly of the body, means for a releasably sealing the interior of the pipeline to block fluid flow therethrough when the arresting means is in said arresting position, thereby to establish a differential fluid pressure between different portions of the body when fluid under pressure is in the pipeline, first spring means having an energy storage condition and a relaxed condition, linking means for linking said spring means to said arresting means, said first spring means operating on said linking means to place the arresting means in said withdrawn position when the first spring means is in its energy storage condition and to place the arresting means in its arresting position when the first spring means is in said relaxed condition, second spring means having a stored energy condition and a relaxed condition, said second spring means exerting in both its conditions a force greater than, and acting oppositely to, the force exerted by the first spring means when in its stored energy condition, means operable in response to said differential fluid pressure for placing said second spring means in its energy storage condition, means for selectively releasing the first and second spring means from their respective energy storage conditions, means operable in response to the release of stored energy from said second spring means for resetting the first spring means to its stored energy condition, thereby to move the arresting means to said withdrawn position and to permit the release of said sealing means from sealing engagement with the interior of the pipeline.

6. The pipeline plugging pig claimed in claim 5 wherein said means operable in response to said differential fluid pressure comprises means defining an expandable volume adapted to receive fluid under pressure and including a member movable in response to expansion of said volume, means for admitting pipeline fluid under pressure to said expandable volume to move the movable member, means operatively connecting the movable member to said second spring means to store energy in said second spring means when said volume expands.

7. The pipeline plugging pig claimed in claim 6 wherein the means defining an expandable volume comprises a piston and cylinder mechanism, said means for admitting pipeline fluid under pressure admitting pipeline fluid under pressure to a region between the piston and cylinder to produce relative displacement therebetween.

8. A pipeline plugging pig comprising a body adapted to move through a pipeline,
a plurality of arresting jaws carried by said body and movable together from withdrawn positions to extended positions in which they are displaced outwardly of the body for engaging the interior wall of said pipeline to arrest the movement of the body through the pipeline,
means for releasably sealing the interior of the pipeline to block fluid flow therethrough when the jaws are engaged with the interior wall of the pipeline, thereby to establish a differential fluid pressure between different portions of the body when fluid under pressure is in the pipeline,
means including first spring means for moving said jaws to said extended position,
restraining means for releasably holding the first spring means in an energy storage condition, thereby to hold the jaws in said withdrawn position,
means selectively operable for releasing the restraining means to permit said first spring means to urge the jaws to said extended positions,
second spring means adapted, when in its energy storage condition and in its relaxed condition, to exert a force greater than that exerted by said first spring means when in its energy storage condition,
means rsponsive to said differential pressure for placing said second spring means in its energy storage condition, and
means selectively operable, in the absence of said differential pressure, for releasing the second spring means from its energy storage condition and for actuating said means including first spring means for returning the first spring means to its energy storage condition and returning said jaws to said withdrawn position.

9. A pipeline plugging pig comprising
a body adapted to move through a pipeline,
a plurality of arresting jaws carried by said body and movable between a withdrawn position and an extended position in which they are displaced outwardly of the body for engaging the interior wall of said pipeline to arrest the movement of the body through the pipeline,
means for releasably sealing the interior of the pipeline to block fluid flow therethrough when the jaws are engaged with the interior wall of the pipeline, thereby to establish a differential fluid pressure between different portions of the body when fluid under pressure is in the pipeline,
first spring means having an energy storage condition and a relaxed condition,
means linking the first spring means to said jaws for permitting the stored energy of the spring means to act on the linking means when the jaws are in said withdrawn position,
restraining means for releasably restraining said linking means against moving said jaws to said extended position,
selectively operable means for releasing the restraining means to permit the stored energy of the springs to act on the linking means and force the jaws to said extended position,
second spring means having a stored energy condition and a relaxed condition,
said second spring means, when in either of its conditions, exerting the first spring means when in its energy storage condition,
means responsive to said differential fluid pressure for placing said second spring means in its energy storage condition,
means selectively operable, in the absence of said differential pressure, for transferring stored energy from the second spring means to the first spring means to reset it in its stored energy condition and for returning the jaws to said withdrawn position.

10. A pipeline plugging pig comprising
a body adapted to be received within and movable through a pipeline,
a plurality of arresting jaws carried by said body and movable from first withdrawn positions to second extended positions in which they are displaced outwardly of the body for engaging the interior wall of said pipeline to arrest the movement of the body through the pipeline,
means for engaging the interior wall of the pipeline to block fluid flow within the pipeline when said jaws are engaged with the interior wall of the pipeline, whereby a differential fluid pressure is established at portions of said body when fluid under pressure is in the pipeline,
first spring means operatively connected to said jaws for urging the jaws from said first to said second positions,
means including latch means for holding said jaws in said first positions against the force of the first spring means,
said latch means being operable in response to a first command to permit the jaws to be moved by the spring means to the second positions, thereby to engage the interior wall of the pipeline,
a second set of spring means,
means responsive to said differential fluid pressure for storing energy in said second set of springs when said pipeline is blocked,
means for releasably holding said second spring means in its stored energy condition irrespective of the differential fluid pressure at said portions of the body,
means operable in response to a second command for releasing said holding means for permitting the second spring means to exert its stored energy on the jaws to move the jaws back to said first position,
said latch means being operable to hold jaws in said first position until receipt of another first command.

11. A pipeline plugging pig comprising
a body adapted to move through a pipeline,
a plurality of arresting jaws carried by said body and movable together from withdrawn positions to extended positions in which they are displaced outwardly of the body for engaging the interior wall of said pipeline to arrest the movement of the body through the pipeline,
means for releasably sealing the interior of the pipeline to block fluid flow therethrough when the jaws are engaged with the interior wall of the pipeline, whereby a differential fluid pressure is established at different portions of the body when fluid under pressure is in said pipeline,
a slidable sleeve member operatively connected to said jaws to move them from the withdrawn position to the extended position,
first spring means operatively connected to said sleeve member for exerting a first force against sqid sleeve member when said jaws are in the withdrawn position and when the spring means is in its stored energy condition, latch means releasably engaging said sleeve member for holding said jaws in the withdrawn positions, latch control means operable in response to a first command for releasing the latch from engagement with said sleeve member to permit the first spring means to slide the sleeve member and move the jaws to said extended positions, a slidable cylinder coaxial with said sleeve means, said cylinder being slidable from a first position to a locking position, said cylinder supporting said latch means, thereby being in motion-restraining engageable with said sleeve when the cylinder is in its first position and said jaws are in said withdrawn position, second spring means operatively connected to said cylinder and adapted when in both its stored energy condition and its relaxed position to exert against said cylinder a force greater in magnitude than, and opposite in direction to, said first force exerted by said first spring means, means operable in response to said differential fluid pressure for sliding the cylinder to its locking position and in turn placing the second spring means in its stored energy condition, means cooperating with said latch means to releasably hold the cylinder in its locking position irrespective of differential fluid pressure at said portions of the body, said latch control means being operable in response to a second command to release said latch means from said cooperating means and again engage the latch means with said sleeve member, whereby upon equalization of fluid pressure at said portions of the body said second spring means may return the cylinder to its first position, return the jaws to said withdrawn positions, and return said first spring means to its stored energy condition.

12. A pipeline plugging pig comprising
a body adapted to move through a pipeline,
a plurality of arresting means carried by said body and movable together from a withdrawn position to an extended position in which they are displaced outwardly of the body for engaging the interior wall of said pipeline to arrest the movement of the body through the pipeline,
means for releasably sealing the interior of the pipeline to block fluid flow therethrough when the arresting means are engaged with the interior wall of the pipeline, whereby a differential fluid pressure is established at different portions of the body when fluid under pressure is in said pipeline,
a slidable sleeve member disposed within said body and operatively connected to said arresting means to move them between the withdrawn position and the extended position,
first spring means operatively connected to said sleeve member for exerting a first force against said sleeve member when said arresting means are in the withdrawn position and when the spring means is in its energy storage condition,
a restraining dog for releasably holding said sleeve in a first position to maintain the first spring means in its energy storage condition and said arresting means in said withdrawn position, said sleeve being operable to slide past said dog to a second position when the dog is in a sleeve-release position, the arresting means being in said extended position when the sleeve is in its second position,
cam means for controlling the positioning of said restraining dog,
motor means for controlling the positioning of the cam means to sequentially position said dog to a sleeve-holding position, then to said sleeve-release position, and then to a locking position in which said arresting means also is in said extended position,
an axially slidable cylinder coaxial with said sleeve, said dog and cam means being mounted on said cylinder for movement therewith,
means operable in response to said differential fluid pressure for sliding said cylinder from an initial position to a locked position in which said dog is out of restraining engagement with said sleeve,
engaging means for engaging said dog when the odg is in said locking position and for holding the cylinder in a locked position irrespective of said differential pressure,
second spring means operatively connected to said cylinder in a manner to be set to its energy storage condition when the cylinder is moved to its locked position,
said dog being disengaged from the dog engaging means and re-engaging said sleeve in response to a predetermined movement of said motor, whereby said second spring means returns the cylinder to its initial position, returns the arresting means to said withdrawn position, and restores the first spring means to its energy storage condition.

* * * * *

UNITED STATES PATENT OFFICE
CERTIFICATE OF CORRECTION

Patent No. 3,746,026            Dated July 17, 1973

Inventor(s) Joseph S. Herring

It is certified that error appears in the above-identified patent and that said Letters Patent are hereby corrected as shown below:

On the cover sheet insert -- [73] Assignee AMF INCORPORATED, a corporation of New Jersey --.

Signed and sealed this 26th day of February 1974.

(SEAL)
Attest:

EDWARD M. FLETCHER, JR.        C. MARSHALL DANN
Attesting Officer             Commissioner of Patents